(12) United States Patent
Suzuki et al.

(10) Patent No.: US 6,369,547 B2
(45) Date of Patent: Apr. 9, 2002

(54) METHOD OF CORRECTING BATTERY REMAINING CAPACITY

(75) Inventors: Katsuhiro Suzuki; Toshitake Kurihara, both of Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/820,175

(22) Filed: Mar. 29, 2001

(30) Foreign Application Priority Data

Mar. 30, 2000 (JP) ........................................ 2000-094073

(51) Int. Cl.[7] ........................... H02J 7/00; G01N 27/416
(52) U.S. Cl. ........................................ 320/132; 324/427
(58) Field of Search ............................... 320/132, 134; 324/432, 427

(56) References Cited

U.S. PATENT DOCUMENTS

| | | | | |
|---|---|---|---|---|
| 5,652,502 A | * | 7/1997 | Van Phouc et al. | ............ 702/63 |
| 5,698,962 A | * | 12/1997 | Sakai et al. | ................. 324/431 |
| 6,157,169 A | * | 12/2000 | Lee | .............................. 320/132 |
| 6,198,254 B1 | * | 3/2001 | Satake et al. | ................ 320/132 |
| 6,259,232 B1 | * | 7/2001 | Douglass et al. | ............ 320/133 |

FOREIGN PATENT DOCUMENTS

JP 05-087896 4/1993

* cited by examiner

*Primary Examiner*—Gregory Toatley
(74) *Attorney, Agent, or Firm*—Fleshner & Kim, LLP

(57) ABSTRACT

A remaining capacity of a battery correcting method outputs the remaining capacity with calculating to an electronic device which change into hibernation when the remaining capacity becomes lower than a hibernation changeover capacity. The method of correcting battery remaining capacity decreases the remaining capacity with a first gradient after corrected to the hibernation changeover capacity, when the remaining capacity at decreasing to 0% detecting voltage is higher than the hibernation changeover capacity. In addition, when the remaining capacity at decreasing to 0% detecting voltage is lower than the hibernation changeover capacity, the remaining capacity is decreased with a second gradient.

14 Claims, 5 Drawing Sheets

METHOD OF CORRECTING BATTERY REMAINING CAPACITY

This application is based on application No. 094073 filed in Japan on Mar. 30, 2000, the content of which incorporated hereinto by reference.

BACKGROUND OF THE INVENTION

This invention relates to a method which calculates and outputs remaining capacity of a battery to an electronic device changing into hibernation when the remaining capacity of the battery becomes hibernation changeover capacity, especially the method which corrects the remaining capacity of the battery to output to the electronic device accurately.

In an electronic device such as a computer, It occurs a problem that a power source is powered down during its processing. For example in a case of a word processor, a writing document can be lost when the power source is powered down during its processing to write a document. Further more, it can occur a problem when software is not logged off in proper. In the case of a computer having a battery as a power source, it is necessary to be powered down to prevent over-supply, when the remaining capacity of the battery becomes little and cannot supply power. Thereby, it can occur the problems mentioned above, if the power source is powered down after the remaining capacity of the battery becomes little.

To solve these problems, a technology in which the power source is powered down with changeover into hibernation, when the remaining capacity of the battery decreases and becomes lower than hibernation changeover capacity, was developed. The hibernation prevents the problems cause of powered down, with saving data in processing to a memory such as a hard disc drive before the power source powered down. An electronic device such as a computer achieving it powers down with changeover hibernation, when the remaining capacity of the battery as a parameter becomes the hibernation changeover capacity. The battery side outputs the remaining capacity to the electronic device such as a computer with calculating.

The battery side calculates the remaining capacity with subtracting supplied capacity from full-charged state to output the remaining capacity to the electronic device. However, the calculated remaining capacity in the battery side does not always equal to practical remaining capacity of the battery. Therefore, the battery side corrects the remaining capacity with detecting battery voltage. FIG. 1 shows a graph of a state, which corrects the remaining capacity with the battery voltage. FIG. 1 shows a character decreasing the battery voltage in accordance with power supply and a character correcting the remaining capacity. A correcting method of FIG. 1 corrects the remaining capacity of the battery to 0% when the battery voltage becomes 0% detecting voltage in accordance with power supply from the battery.

The correcting method mentioned above can prevent battery from over-supplying with correcting the remaining capacity of the battery around 0% certainly. However, the method correcting the remaining capacity in such way cannot always log off electronic devices such as a computer with changeover hibernation. For example, in the case the battery outputs the remaining capacity with sampling time at point a and point b of FIG. 1, it does not change into hibernation cause the remaining capacity is higher than the hibernation changeover capacity, and it cannot change into hibernation cause the remaining capacity is 0% which means supplying out completely, in the correcting method of FIG. 1, the remaining capacity drops to 0% in an instant, so that it cannot change into hibernation.

A method, which does not correct the remaining capacity of the battery to 0% in an instant, was developed (Japanese Patent Laid-Open Publication No. Toku-Kai-Hei 5-87896 (1993)). As shown in FIG. 2 and FIG. 3, the method mentioned above in the Application corrects the remaining capacity of the battery at point A, B, C and D to measure the battery voltage. Voltage is set in advance corresponding to each of the remaining capacity of the battery when the battery voltage becomes the voltage at point A, B, C and D, and the remaining capacity of the battery is corrected to the remaining capacity at point A, B, C and D when the battery voltage becomes the voltage.

As shown in FIG. 2 and FIG. 3, the method correcting the remaining capacity with the battery voltage can calculate and correct remaining capacity similar to the actual remaining capacity. However, it can occur not to change into hibernation properly, even in the method correcting the remaining capacity to output the electronic device.

For example, at the point A and B of FIG. 3, when the battery outputs the remaining capacity to the electronic device, the remaining capacity is higher than the hibernation changeover voltage at point a, so that the electronic device does not change into hibernation, next even though the remaining capacity is lower than the hibernation changeover voltage at point b, the remaining capacity has already got down to 0%, the electronic device becomes a state which cannot change into the hibernation.

The present invention has developed to achieve the object to solve the problems. The important object of the present invention is to provide a method of correcting battery remaining capacity, which can log off an electronic device with changing into hibernation certainly, when the remaining capacity becomes little. The above and further objects and features of the invention will more fully be apparent from the following detailed description with accompanying drawings.

SUMMARY OF THE INVENTION

A remaining capacity of a battery correcting method of the present invention outputs the remaining capacity with calculating to an electronic device which change into hibernation when the remaining capacity of the battery becomes lower than hibernation hangover capacity. The method of correcting battery remaining capacity decreases the remaining capacity with predetermined gradient after corrected to the hibernation changeover capacity, when the remaining capacity at battery voltage being decreasing to 0% detecting voltage is higher than the hibernation changeover capacity. In addition, when the remaining capacity at decreasing to 0% detecting voltage is lower than the hibernation changeover capacity, the remaining capacity is decreased with predetermined gradient.

The invention mentioned above has an advantage that it can log off the electronic device certainly by changing hibernation when the remaining capacity of the battery becomes little. It causes that the method of correcting battery remaining capacity decreases the remaining capacity with predetermined gradient after corrected to the hibernation changeover capacity, the remaining capacity is decreased with predetermined gradient, when the remaining capacity at decreasing to 0% detecting voltage is higher than the hibernation changeover capacity, and when the remaining capacity at decreasing to 0% detecting voltage is lower than the hibernation changeover capacity.

In the method of correcting battery remaining capacity according to the present invention, preferably the 0% detecting voltage is set to voltage that the remaining capacity of the battery becomes 2–5%.

In addition, in the method of correcting battery remaining capacity according to the present invention, preferably the gradient to decrease the remaining capacity after detecting the 0% detecting voltage is set a constant gradient of the remaining capacity decreasing value per time.

Further, in the method of correcting battery remaining capacity according to the present invention, preferably the gradient to decrease the remaining capacity of the battery after detecting the 0% detecting voltage is set value that the remaining capacity becomes 0 within 10–60 seconds.

Further, in the method of correcting battery remaining capacity according to the present invention, preferably after detecting the 0% detecting voltage, consumed power of the electronic device is calculated, and the gradient to decrease the remaining capacity is determined by the consumed power.

Further more, in the method of correcting battery remaining capacity according to the present invention, preferably the gradient to decrease the remaining capacity after detecting the 0% detecting voltage is set to make decreasing time that the remaining capacity of the battery becomes 0 longer than a period of sampling time to output the remaining capacity to the electronic device.

DETAILED DESCRIPTION OF THE INVENTION

Figure 1:
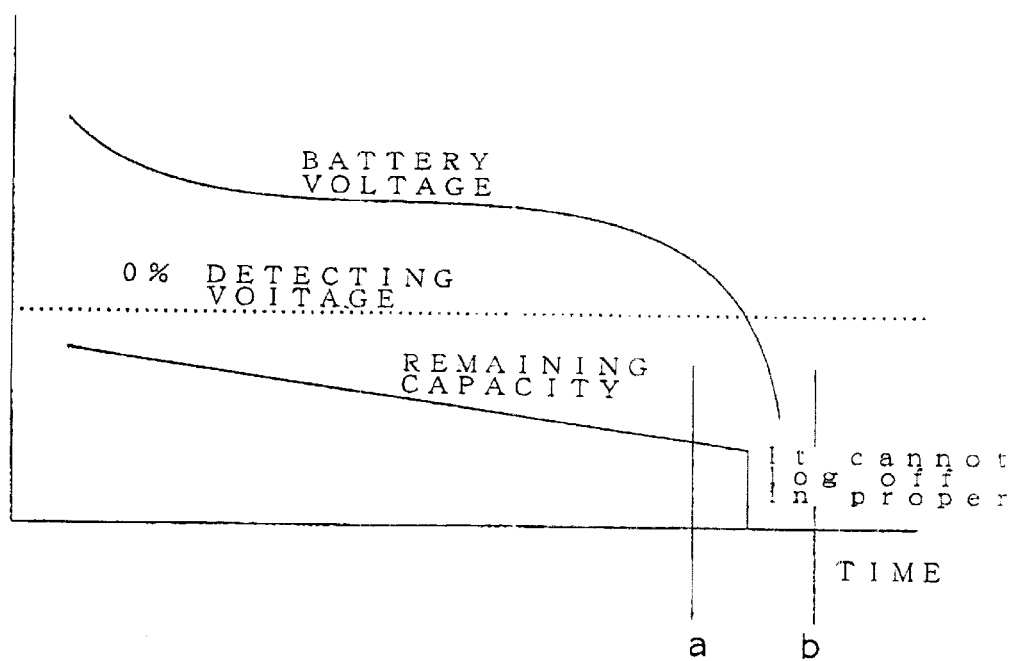
FIG. 1 shows a graph of the state correcting the remaining capacity with voltage of the battery.
Figure 2:
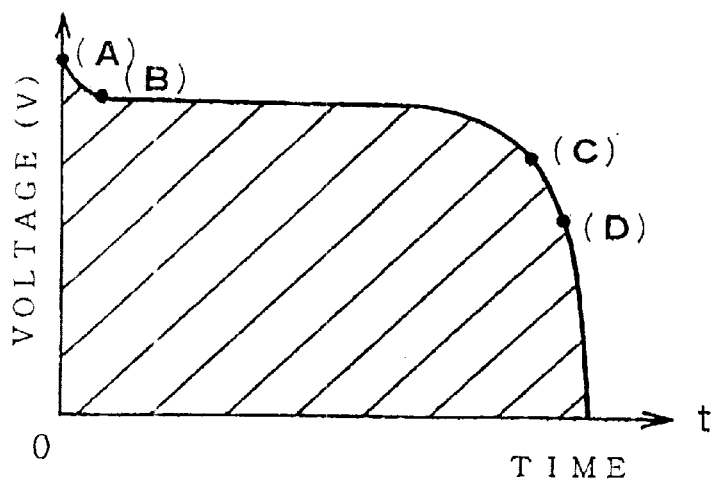
FIG. 2 shows a graph of the power supply character of the battery voltage in the prior remaining capacity correcting method.
Figure 3:
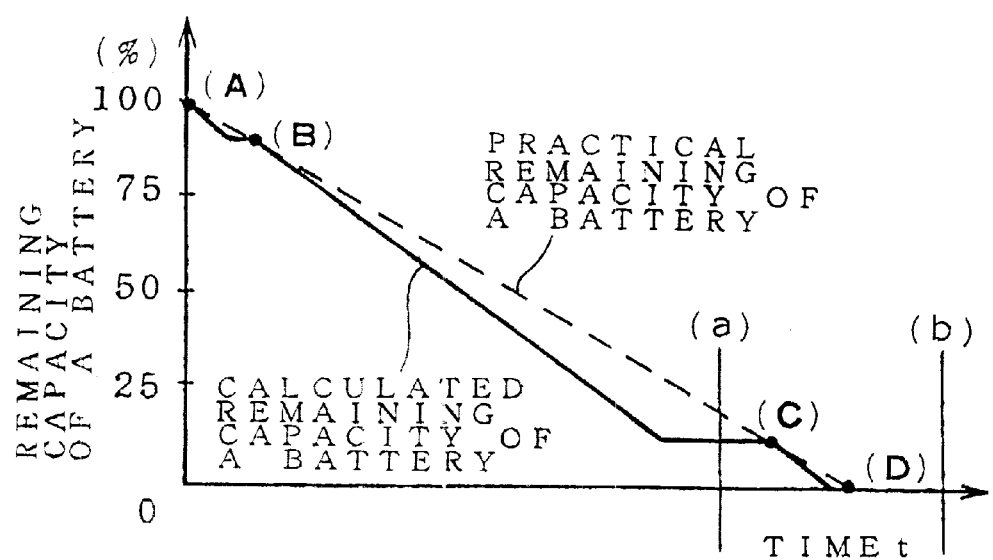
FIG. 3 shows a graph of the state correcting the remaining capacity in the prior remaining capacity correcting method.
Figure 4:
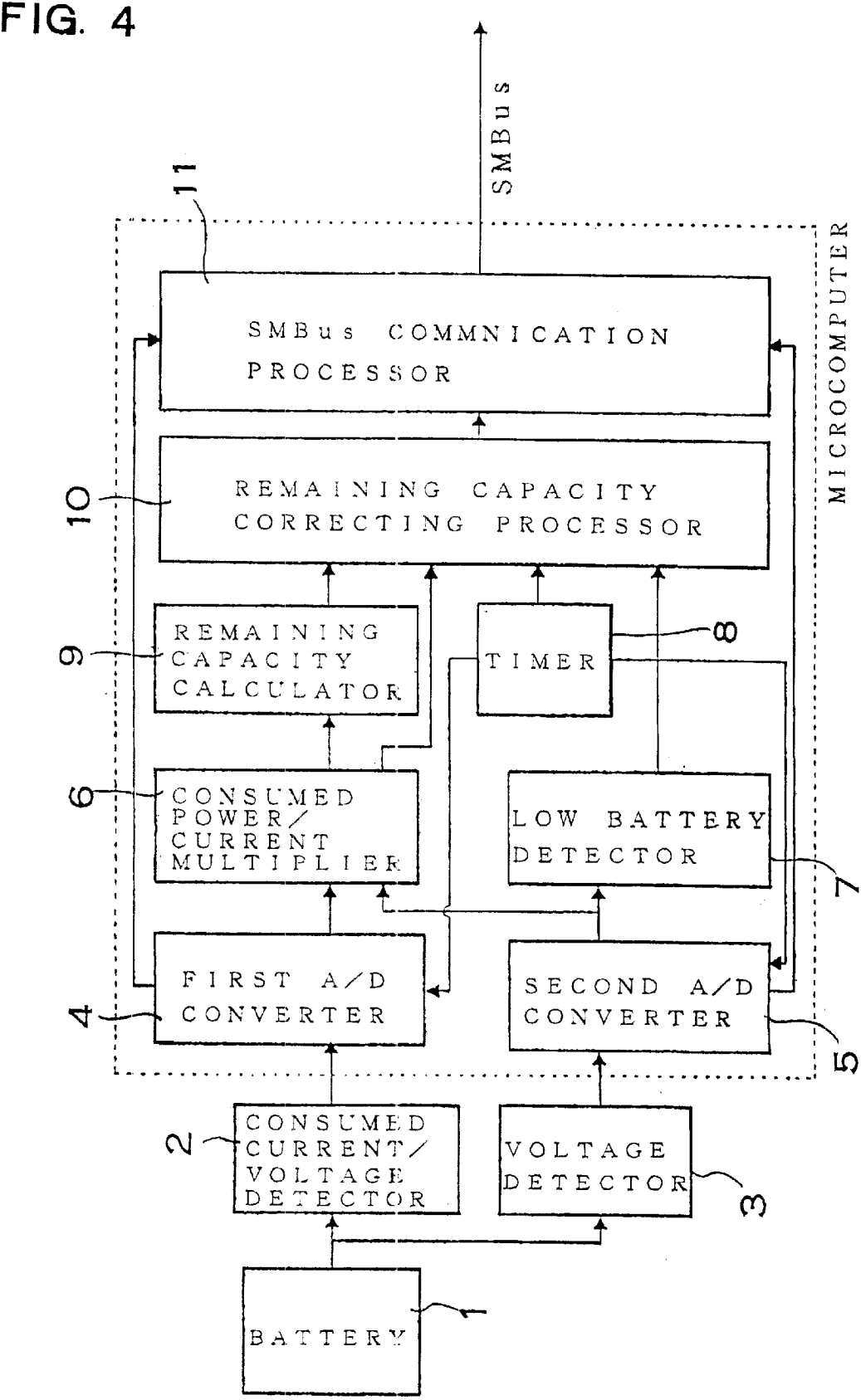
FIG. 4 shows a block diagram of the circuit used in the embodiment of the remaining capacity correcting method of the present Invention.

FIG. 4 shows a block diagram of a circuit used in the remaining capacity correcting method of the present invention, as a circuit attached inside of a battery pack. The battery pack having the circuit of FIG. 4 is attached to an electronic device such as a computer, supplies power to the electronic device, and outputs remaining capacity to the electronic device. The electronic device communicates with the battery pack in period of predetermined sampling time, detects the remaining capacity of the battery, and changes into hibernation when the remaining capacity is lower than hibernation changeover capacity. The battery pack calculates the supplied capacity with the circuit shown in FIG. 4 to output the remaining capacity to the electronic device.

The battery pack of FIG. 4 has a consumed current/voltage detector 2 detecting consumed current of the battery 1 with converting into voltage, a voltage detector 3 detecting voltage of the battery 1, a first A/D converter 4 converting an analog signal of the output of the consumed current/voltage detector 2 into an digital signal, a second A/D converter 5 converting an analog signal as the output from the voltage detector 3 into a digital signal, a consumed power/current multiplier 6 integrating the consumed current of the battery 1 from the output signal of the first A/D converter 4 or the consumed current output from the first A/D converter 4, a low battery detector 7 detecting 0% detecting voltage with output signal of the second A/D converter 5, a timer 8 generating a trigger in a constant period for the first A/D converter 4 and the second A/D converter 5 to convert the analog signals into the digital signals, a remaining capacity calculator 9 calculating the remaining capacity with subtracting the consumed power or the current from a full-charged capacity, a remaining capacity correcting processor 10 correcting the remaining capacity calculated in the remaining capacity of the battery calculator 9 with an output of the low battery detector 7, and a SMBus communicating processor 11 outputting the calculated remaining capacity to the electronic device with communicating. The battery pack is connected with the electronic device such as a computer via SMBus.

The consumed current/voltage detector 2 has a current detecting resistor connected with the battery 1 in series which has a small resistance, and a differential amplifier amplifying voltage generated between each end of the current detecting resistor. The consumed current/voltage detector 2 outputs the output voltage of the differential amplifier as current of the battery 1. The output voltage of the differential amplifier is the product of the current in the battery 1 by a constant.

The output of the consumed current/voltage detector 2 and the voltage detector 3 are analog signals. The first A/D converter 4 and the second A/D converter 5 output the digital signals converted from the analog signals to calculate the remaining capacity of the battery with digital processing and to correct the remaining capacity of the battery. The first A/D converter 4 and the second A/D converter 5 output the digital signals converted from the input voltage signals with the timing of the trigger input by the timer 8, The consumed power/current multiplier 6 integrates the consumed power of the battery 1 or the consumed current. There are two methods to calculate the rest of the battery capacity, one method uses power as a parameter and another method uses current as a parameter. Therefore, in the method using power as a parameter the circuit calculates the product of the consumed power, in the method using current as a parameter the circuit integrates the consumed current. The product of the consumed power is calculated as a product of the current output from the first A/D converter 4 by the voltage output from the second A/D converter 5. The product of the consumed current is calculated with integrating the current output from the first A/D converter 4.

The remaining capacity calculator 9 calculates the remaining capacity of the battery with subtracting the consumed power or the consumed current from the full-charged capacity of the battery 1 and then outputs the signal showing the calculated remaining capacity of the battery to the remaining capacity correcting processor 10. There are different methods to calculate the remaining capacity of the battery, one method calculates using a relative vale against the full-charged capacity or a rated capacity as 100%, another method calculates with Ah or Wh.

The low battery detector 7 detects whether the voltage of the battery 1 becomes lower than 0% detecting voltage or not with output of the second A/D converter 5. When the voltage of the battery 1 becomes lower than the 0% detecting voltage, the 0% detecting voltage signal is output to the remaining capacity correcting processor 10.

The remaining capacity correcting processor 10 corrects the remaining capacity of the battery 1 input from the rest of battery capacity calculator 9 with hibernation changeover capacity, when the battery voltage becomes lower than the 0% detecting voltage and the low battery detector 7 inputs the 0% detecting voltage signal. Here, the battery voltage of the 0% detecting voltage is set higher than voltage with the battery 1 supplying out completely. It causes to prevent the battery 1 to over-supply with the electronic device changing into hibernation after the battery voltage becomes lower than the 0% detecting voltage. Setting the 0% detecting voltage higher makes the practical remaining capacity of the battery 1 when the battery voltage becomes lower than the 0% detecting voltage larger. If the voltage is higher, the battery 1 cannot supply completely so that the practical capacity that the battery 1 can supply decreases. On the other hand, if the 0% detecting voltage is lower, though the battery 1 can supply completely, probability to over-supply is higher with changing into hibernation. Therefore, the 0% detecting voltage is set for voltage not to make the battery 1 over-supply and to make the battery 1 be able to supply enough.

In addition, the hibernation changeover capacity can be set for 1–5% of the full-charged capacity of the battery 1, preferably 2–5%, more preferably about 3%. In lithium-ion secondary battery, setting the 0% detecting voltage for 3.5V/cell can set the hibernation changeover capacity for about 3%.

Figure 5:
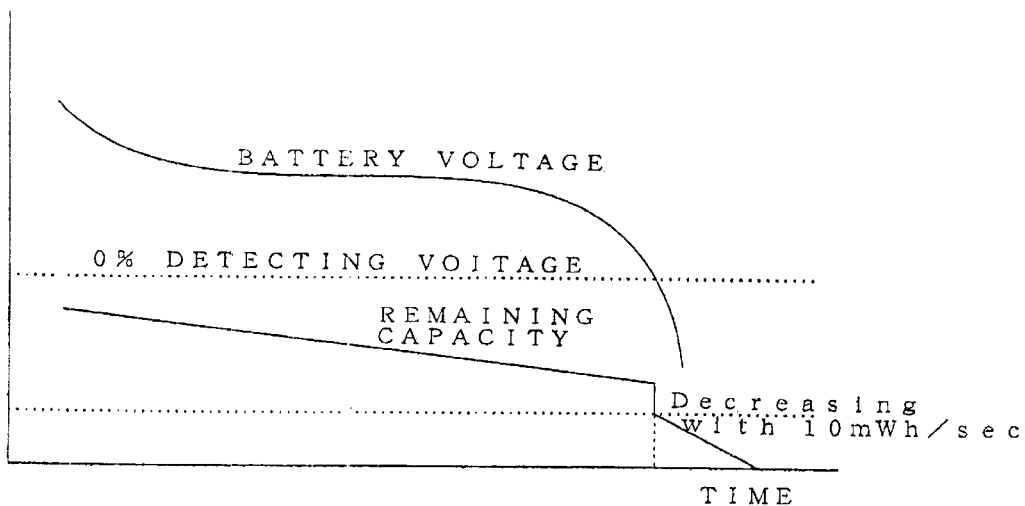
FIG. 5 shows a graph of the state correcting the remaining capacity, when the calculated remaining capacity is higher than the hibernation changeover capacity.
Figure 6:
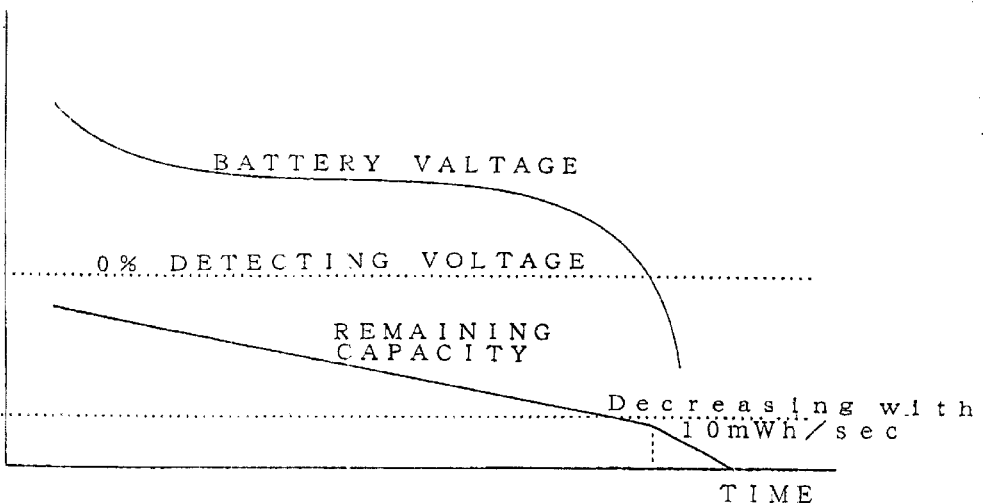
FIG. 6 shows a graph of the state correcting the remaining capacity, when the calculated remaining capacity is lower than the hibernation changeover capacity.

FIG. 5 and FIG. 6 show basic operation that the remaining capacity correcting processor 10 corrects the remaining capacity of the battery with detecting the 0% detecting voltage. FIG. 5 shows a state that the remaining capacity of the battery calculated in the rest of the battery calculator 9 is higher than the hibernation changeover capacity when the voltage of the battery 1 becomes lower than the 0% detecting voltage. In this state, when the 0% detecting voltage is detected, the calculated remaining capacity of the battery is corrected into hibernation changeover capacity. Subsequently the remaining capacity of the battery is decreased in a predetermined gradient. To speak the gradient to decrease the remaining capacity of the battery, for example, the remaining capacity of the battery decreasing value per time is constant gradient to decrease the remaining capacity of the battery. The decreasing time to 0% with the remaining capacity of the battery decreasing, after correcting the remaining capacity of the battery into hibernation changeover capacity with detecting the 0% detecting voltage, is set longer than the period of the sampling time outputting the remaining capacity of the battery to the electronic device. For example, the gradient of the remaining capacity of the battery decreasing value per time is set with the decreasing time from the hibernation changeover capacity to 0% set for 10–60 seconds, preferably 10–50 seconds, more preferably 15–30 seconds.

FIG. 6 shows a state that the remaining capacity of the battery calculated in the rest of the battery calculator 9 is lower than the hibernation changeover capacity when the voltage of the battery 1 becomes lower than the 0% detecting voltage. In this state, when the voltage of the battery 1 becomes lower than the 0% detecting voltage, the calculated remaining capacity of the battery is not corrected to be higher to the hibernation changeover capacity, but then the calculated remaining capacity of the battery is decreased with the predetermined gradient. The gradient to decrease the remaining capacity of the battery after detecting the 0% detecting voltage is same as the graph shown in FIG. 5. Here, the gradient can be lower or higher than the gradient to decrease in the case that the calculated remaining capacity of the battery is higher than the hibernation changeover capacity, if the calculated remaining capacity of the battery when detecting the 0% detecting voltage is lower than the hibernation changeover capacity.

Here, in the method described above it is explained that the remaining capacity of the battery is decreased with a constant gradient after the voltage of the battery 1 becomes lower than the 0% detecting voltage. On contrast, in the rest of the battery correcting method of the present invention, it is not always necessary that the remaining capacity of the battery is decreased with a constant gradient after the 0% detecting voltage is detected. For example, after detecting the 0% detecting voltage, the gradient to decrease the remaining capacity of the battery can be varied in accordance with time or alternatively the calculated consumed power may decrease the remaining capacity of the battery by calculating the consumed power of electronic device, in this case, the 0% detecting voltage should be set to be able to make the electronic device change into hibernation certainly in the time that the rest of the battery device. becomes 0 after detecting the 0% detecting voltage. The 0% detecting voltage set so that the time from detecting the 0% detecting voltage to the rest of the battery device becoming 0 is set 10–60 seconds for example, preferably 10–50 second, more preferably 15–30 seconds. Setting the 0% detecting voltage higher makes the practical remaining capacity of the battery 1 larger when detecting 0% detecting voltage. Therefore, it can make time to supply out completely after detecting 0% detecting voltage longer.

The SMBus communication processor 11 is a communicating portion to send the remaining capacity of the battery calculated in the rest of battery capacity correcting processor 10 via SMBus to the electronic device. The SMBus communication processor 11 output the calculated remaining capacity of the battery when the electronic device inputs an output instruction signal for the rest of battery capacity to the SMBus communication processor 11. The electronic device output the output instruction signal for the rest of battery capacity to the SMBus communication processor 11 in predetermined sampling time. When the signal is input, the SMBus communication processor 11 outputs the remaining capacity of the battery 1 to the electronic device. The electronic device judges whether to change into hibernation or not based on the remaining capacity of the battery 1 from the SMBus communication processor 11. The electronic device logs off normally with changing into hibernation, when the remaining capacity of the battery 1 is lower than the hibernation changeover capacity.

Figure 7:
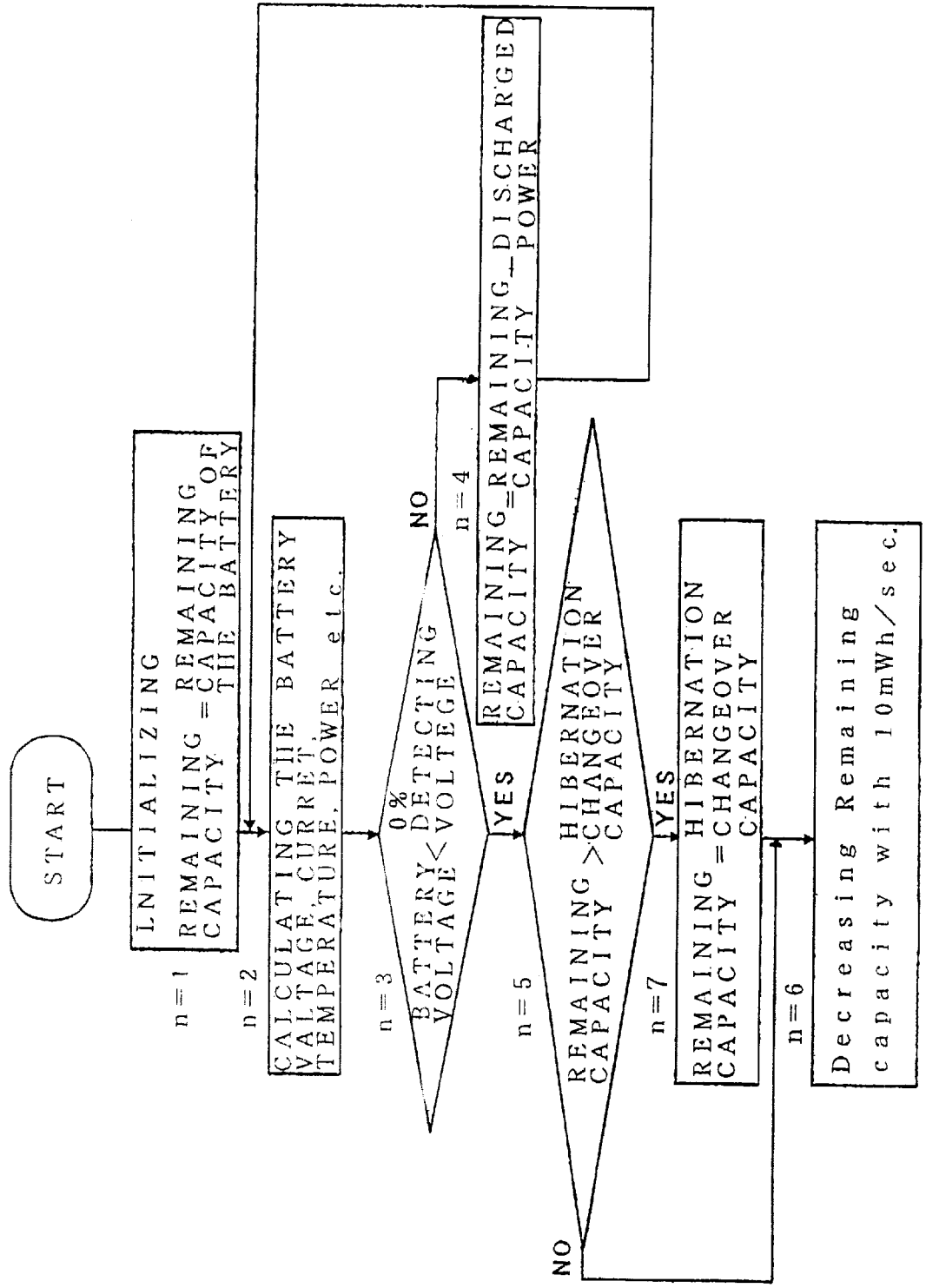
FIG. 7 shows a flowchart of the process of the circuit shown in FIG. 4 correcting the remaining capacity of the battery.

The circuit of FIG. 4 corrects the remaining capacity of the battery with steps of FIG. 7.

[Step of n=1]

Initializing.

[Step of n=2]

Calculating the remaining capacity of the battery 1 with detecting voltage, current, temperature and power of the battery 1. The remaining capacity is calculated with subtracting the consumed power or integration of the consumed current from the full-charged capacity.

[Step of n=3]

Determining whether the battery voltage is higher than the 0% detecting voltage or not with comparing.

[Step of n=4]

Calculating the remaining capacity with subtracting integration of the consumption of discharging power from the remaining capacity and going to the step of n=2, when the battery voltage is not lower than the 0% detecting voltage, in other words the battery voltage is equal or over to the 0% detecting voltage,

[Step of n=5]

Comparing the calculated remaining capacity with the hibernation changeover capacity, when the battery voltage is lower than the 0% detecting voltage.

[Step of n=6]

Decreasing the calculated remaining capacity with constant gradient, when the calculated remaining capacity is not higher than the hibernation changeover capacity, in other words the calculated remaining capacity is equal or less to the hibernation changeover capacity. In FIG. 7, decreasing the remaining capacity of the battery with 0 mWh/sec as gradient.

[Step of n=7]

Correcting the calculated remaining capacity to the hibernation changeover capacity, when the calculated remaining capacity is higher than the hibernation changeover capacity. Subsequently it goes to the step of n=6 to decrease the remaining capacity with a predetermined constant gradient.

The remaining capacity of the battery 1 corrected with the steps described above is output from the SMBus communication processor 11 to the electronic device.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A method of correcting battery remaining capacity for outputting the remaining capacity with calculating to an electronic device which change into hibernation when the remaining capacity of the battery becomes lower than a hibernation changeover capacity, the method comprising the steps of:

decreasing the remaining capacity with a first gradient after correcting the remaining capacity to the hibernation changeover capacity when the remaining capacity at decreasing to 0% detecting voltage is higher than the hibernation changeover capacity, decreasing the remaining capacity with a second gradient when the remaining capacity at decreasing to 0% detecting voltage is lower than the hibernation changeover capacity.

2. The method of correcting battery remaining capacity according to claim 1, wherein the 0% detecting voltage is set to voltage that the remaining capacity of the battery becomes 2–5%.

3. The method of correcting battery remaining capacity according to claim 1, wherein the battery is a lithium-ion secondary battery, and
    the 0% detecting voltage is set to 3.5 V/cell.

4. The method of correcting battery remaining capacity according to claim 3, wherein the battery is a lithium-ion secondary battery, and
    the 0% detecting voltage is set to voltage that the remaining capacity of the battery becomes 3%.

5. The method of correcting battery remaining capacity according to claim 1, wherein the gradient to decrease the remaining capacity after detecting the 0% detecting voltage is set a constant gradient of the remaining capacity decreasing value per time.

6. The method of correcting battery remaining capacity according to claim 1, wherein the gradient to decrease the remaining capacity after detecting the 0% detecting voltage is set value that the remaining capacity becomes 0 within 10–60 seconds.

7. The method of correcting battery remaining capacity according to claim 1, wherein the gradient to decrease the remaining capacity after detecting the 0% detecting voltage is set value that the remaining capacity becomes 0 within 10–10 seconds.

8. The method of correcting battery remaining capacity according to claim 1, wherein the gradient to decrease the remaining capacity after detecting the 0% detecting voltage is set value that the remaining capacity becomes 0 within 15–30 seconds.

9. The method of correcting battery remaining capacity according to claim 1, wherein when detecting the 0% detecting voltage, not correcting the calculated remaining capacity to increase to the hibernation changeover capacity, and subsequently decreasing the remaining capacity with the second gradient same as the first gradient.

10. The method of correcting battery remaining capacity according to claim 1, wherein when detecting the 0% detecting voltage, not correcting the calculated remaining capacity to increase to the hibernation changeover capacity, and subsequently decreasing the remaining capacity with the second gradient smaller than the first gradient.

11. The method of correcting battery remaining capacity according to claim 1, wherein when detecting the 0% detecting voltage, not correcting the calculated remaining capacity to increase to the hibernation changeover capacity, and subsequently decreasing the remaining capacity with the second gradient larger than the first gradient.

12. The method of correcting battery remaining capacity according to claim 1, wherein after detecting the 0% detecting voltage, changing the gradient for decreasing the remaining capacity in accordance with time.

13. The method of correcting battery remaining capacity according to claim 1, wherein after detecting the 0% detecting voltage, calculating the consumed power of the electronic device, and determining the gradient for decreasing the remaining capacity based on the consumed power.

14. The method of correcting battery remaining capacity according to claim 1, wherein the first gradient for decreasing the remaining capacity after detecting the 0% detecting voltage and correcting the remaining capacity to the hibernation changeover capacity is set so as to make decreasing time for which the remaining capacity becomes 0% after the 0% detecting voltage is detected longer than a period of sampling time for output the remaining capacity to the electronic device.

* * * * *